United States Patent
Maruyama

(10) Patent No.: US 11,135,759 B2
(45) Date of Patent: Oct. 5, 2021

(54) BLOW MOLDING APPARATUS AND BLOW MOLDING METHOD

(71) Applicant: NISSEI ASB MACHINE CO., LTD., Nagano (JP)

(72) Inventor: Junichi Maruyama, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 24 days.

(21) Appl. No.: 16/644,713

(22) PCT Filed: Sep. 7, 2018

(86) PCT No.: PCT/JP2018/033323
§ 371 (c)(1),
(2) Date: Mar. 5, 2020

(87) PCT Pub. No.: WO2019/050021
PCT Pub. Date: Mar. 14, 2019

(65) Prior Publication Data
US 2020/0282626 A1    Sep. 10, 2020

(30) Foreign Application Priority Data
Sep. 8, 2017 (JP) .............................. JP2017-173368

(51) Int. Cl.
*B29C 49/64* (2006.01)
*B29C 49/12* (2006.01)
(Continued)

(52) U.S. Cl.
CPC .......... *B29C 49/6445* (2013.01); *B29C 49/06* (2013.01); *B29C 49/12* (2013.01); *B29L 2031/712* (2013.01)

(58) Field of Classification Search
CPC . B29C 49/6445; B29C 49/4252; B29C 49/12; B29C 49/36
See application file for complete search history.

(56) References Cited

U.S. PATENT DOCUMENTS 5,124,110 A    6/1992 Yokobayashi
5,229,142 A *  7/1993 Yokobayashi .......... B29C 49/12
                                                            425/522
(Continued)

FOREIGN PATENT DOCUMENTS

CN    1078939 A    12/1993
CN    1169691 A     1/1998
(Continued)

OTHER PUBLICATIONS

Partial machine translation of FR2215304A1 dated Aug. 1974 obtained from the espace website. (Year: 1974).*
(Continued)

*Primary Examiner* — Robert B Davis
(74) *Attorney, Agent, or Firm* — Greenblum & Bernstein, P.L.C.

(57) ABSTRACT

A temperature adjustment part is configured to stretch a preform by moving a temperature adjustment rod toward a bottom surface portion (lower body portion) side of a body portion by a predetermined distance, after inserting the temperature adjustment rod into the preform to bring the temperature adjustment rod into contact with an inner surface of the body portion of the preform other than a boundary portion between the body portion and a neck portion.

5 Claims, 4 Drawing Sheets

(51) Int. Cl.
B29C 49/06 (2006.01)
B29L 31/00 (2006.01)

(56) References Cited

U.S. PATENT DOCUMENTS

| | | | |
|---|---|---|---|
| 5,290,506 A | 3/1994 | Yokobayashi | |
| 5,468,443 A | 11/1995 | Takada et al. | |
| 5,744,176 A | 4/1998 | Takada et al. | |
| 5,753,279 A | 5/1998 | Takada et al. | |
| 5,869,110 A | 2/1999 | Ogihara | |
| 5,972,255 A | 10/1999 | Takada et al. | |
| 6,019,933 A | 2/2000 | Takada et al. | |
| 6,109,907 A | 8/2000 | Takada et al. | |
| 6,241,938 B1 | 6/2001 | Barel et al. | |
| 6,247,916 B1 | 6/2001 | Takada et al. | |
| 2001/0031291 A1 | 10/2001 | Takada et al. | |
| 2011/0132892 A1 | 6/2011 | Winzinger et al. | |
| 2011/0135288 A1 | 6/2011 | Winzinger et al. | |
| 2011/0236524 A1 | 9/2011 | Blochmann et al. | |
| 2014/0131920 A1* | 5/2014 | Nakahara | B29C 49/06 264/328.16 |
| 2016/0193750 A1 | 7/2016 | Gaiotti et al. | |
| 2016/0361860 A1 | 12/2016 | Nakahara | |
| 2017/0129158 A1 | 5/2017 | Miyazawa et al. | |
| 2017/0157832 A1* | 6/2017 | Wagner | B29C 49/421 |
| 2017/0291334 A1 | 10/2017 | Aktas | |
| 2018/0257264 A1* | 9/2018 | Kawamura | B29C 49/48 |
| 2019/0308349 A1 | 10/2019 | Aktas | |
| 2019/0308362 A1 | 10/2019 | Miyazawa et al. | |
| 2020/0307045 A1 | 10/2020 | Aktas | |

FOREIGN PATENT DOCUMENTS

| | | | |
|---|---|---|---|
| CN | 102085721 A | 6/2011 | |
| CN | 102085722 A | 6/2011 | |
| CN | 102159377 A | 8/2011 | |
| CN | 105658389 A | 6/2016 | |
| CN | 106414026 A | 2/2017 | |
| CN | 107000262 A | 8/2017 | |
| CN | 107097365 A | 8/2017 | |
| EP | 0 511 617 A1 | 11/1992 | |
| FR | 2215304 A1 * | 8/1974 | B29C 49/06 |
| JP | 3-39226 | 2/1991 | |
| JP | 5-131528 | 5/1993 | |
| JP | 5-185494 | 7/1993 | |
| JP | 05-228991 A | 9/1993 | |
| JP | 6-305006 | 11/1994 | |
| JP | 2000-877 | 1/2000 | |
| JP | 2012-101486 | 5/2012 | |

OTHER PUBLICATIONS

Official Communication (ISA/210) issued in International Patent Application No. PCT/JP2018/033323, dated Jan. 29, 2019, and English translation thereof.
Official Communication (ISA/237) issued in International Patent Application No. PCT/JP2018/033323, dated Jan. 29, 2019 and English translation thereof.
Office Action issued in Chinese Patent Application No. 201880057855.4 dated Apr. 19, 2021, along with English Translation thereof.
Extended European Search Report issued on European Patent Application No. 18854795.4 dated Apr. 19, 2021.

* cited by examiner

BLOW MOLDING APPARATUS AND BLOW MOLDING METHOD

TECHNICAL FIELD

The present invention relates to a blow molding apparatus and a blow molding method for molding a resin container, and for example, relates to a blow molding apparatus and a blow molding method capable of molding a resin container having a good thickness distribution and appearance even under a high cycle condition in which a molding cycle time is very short.

BACKGROUND ART

In related art, as a blow molding apparatus for a resin container, there is a cold parison type apparatus which performs blow molding by cooling a preform once to room temperature and reheating the preform, and a hot parison type (one-stage type) apparatus which performs blow molding by utilizing residual heat (internal heat) during injection molding without cooling an injection-molded preform to room temperature.

Such a hot parison type blow molding apparatus is superior to the cold parison type blow molding apparatus in terms of energy consumption and the variety of moldable container shapes, and is suitably used, for example, when molding a small or medium-sized resin container.

In addition, in the hot parison type blow molding apparatus, a plurality of preforms are injection-molded at one time. However, temperatures of the plurality of preforms being released from an injection molding mold are usually not uniform, and even within one preform, the temperature is usually not uniform. Due to such a temperature variation of the preforms, the resin container as a final molded product may not be formed with a desired thickness distribution and appearance. That is, due to the temperature variation of the preforms, it may not be possible to mold a plurality of resin containers of equal quality satisfying customer specifications at the same time.

In order to solve such problems, there is a hot parison type blow molding apparatus that includes a temperature adjustment part for performing a treatment of adjusting the temperature of an injection-molded preform (temperature adjustment treatment), and optimizes a temperature condition of each preform (see, for example, Patent Literatures 1 to 3).

CITATION LIST

Patent Literature

Patent Literature 1: JP-A-H03-39226
Patent Literature 2: JP-A-H05-131528
Patent Literature 3: JP-A-H06-305006

SUMMARY OF INVENTION

Technical Problem

The hot parison type blow molding apparatus includes a lip mold which holds a neck portion of the preform or the resin container, and by rotating the lip mold, the preform or the resin container is configured to be intermittently and cyclically transported to a plurality of sections where manufacturing steps are performed. Examples of the plurality of sections include an injection molding part, a temperature adjustment part, a blow molding part, and a take-out part.

Therefore, in the hot parison type blow molding apparatus, the number of the preforms injection-molded in the injection molding part is the same as the number of the preforms blow-molded in the blow molding part. Therefore, the hot parison type blow molding apparatus has a problem that the productivity is lower than that of the cold parison type blow molding apparatus.

However, in recent years, the productivity of the hot parison type blow molding apparatus has been improved by improving a structure of the mold and the apparatus itself. For example, the number of rows of the lip mold provided in the apparatus is increased (for example, three or more rows), and the molding cycle time is further shortened. As a result, the number of molded products (resin containers) taken per cycle has increased, and the time taken for one cycle has been shortened.

Under a high cycle condition in which the molding cycle time is significantly shortened, a time during which the preform can be subjected to a temperature adjustment treatment in the temperature adjustment part is shortened. For example, when the molding cycle time in a continuous operation is 5 to 7 seconds, the time during which the preform can be subjected to the temperature adjustment treatment can be ensured only for about 3 to 4 seconds in consideration of the operation time of various mechanisms in the apparatus and the transport time of the preform.

The molding cycle time in the continuous operation is, for example, an interval time of taking out the resin container for one batch (one shot of injection molding). In other words, the molding cycle time in an intermittent rotation type hot parison type blow molding apparatus is approximately a time required for an injection molding step, which is in a rate-determining stage, and specifically, a sum value of an injection molding time+an injection mold opening/closing time and an intermittent transport time of the lip mold.

In this short time, it is very difficult to eliminate an uneven temperature derived from injection molding generated in the preform alone and to impart an appropriate temperature distribution by the temperature adjustment part. In addition, when an appropriate temperature distribution cannot be imparted to the preform, it is difficult to produce a molded product having sufficient quality. Further, with an increase in the number of simultaneous moldings per cycle, the temperature variation among the preforms is likely to occur, and it is difficult to make the temperature conditions of the plurality of preforms uniform.

As a result, in the method in the related art, there is a possibility that the temperature adjustment part cannot perform an appropriate temperature adjustment treatment to the preform.

In addition, in the hot parison type blow molding apparatus, the residual heat in an upper portion of the preform is gradually taken away by the lip mold, and the temperature of that portion tends to be lower than that of other portions. Further, in a preform, a portion having a high residual heat (temperature) tends to be easily stretched during the blow molding.

Therefore, in the resin container after the blow molding, the thickness under the neck (shoulder portion) is likely to be thick (large thickness is easily generated), while a body portion is likely to be thin. That is, a required thickness cannot be ensured in each portion of the resin container, and the strength (rigidity or top load (buckling strength, vertical compression load resistance, etc.)) of the molded product tends to be low. In particular, when molding a small and lightweight resin container, such an influence cannot be ignored since the size of the preform is small.

The temperature adjustment part can perform a temperature adjustment treatment to the preform, but there is a problem that it is difficult to perform an appropriate temperature adjustment treatment to a preform for molding a small and lightweight resin container because the body portion is formed in a bowl shape and a length (height) thereof is very short.

The present invention has been made in view of such circumstances, and an object thereof is to provide a blow molding apparatus and a blow molding method for a resin container which can allow a temperature adjustment part to optimize a temperature condition of a preform in a relatively short time, and allow a blow molding part to blow-mold a resin container with a good thickness distribution and appearance.

Solution to Problem

One aspect of the present invention for solving the above problem relates to a blow molding apparatus including: an injection molding part configured to injection-mold a preform including a neck portion and a bottomed body portion continuous from the neck portion; a temperature adjustment part including a temperature adjustment mold for accommodating the preform and a temperature adjustment rod to be inserted into the preform, and the temperature adjustment part configured to perform a temperature adjustment treatment to the preform by bringing the temperature adjustment rod into contact with an inner surface of the preform while accommodating the preform in the temperature adjustment mold in a non-contact manner; and a blow molding part configured to blow-mold the preform to form a resin container, wherein the temperature adjustment part is configured to stretch the body portion by moving the temperature adjustment rod toward a bottom surface portion side of the body portion by a predetermined distance, after inserting the temperature adjustment rod into the preform to bring the temperature adjustment rod into contact with an inner surface of the body portion other than a boundary portion between the body portion and the neck portion.

Here, it is preferable that the temperature adjustment part is configured to stretch the body portion by moving the temperature adjustment rod within a range where the preform does not come into contact with the temperature adjustment mold.

It is preferable that the temperature adjustment rod is adjusted to a temperature lower than that of the preform when the preform is accommodated in the temperature adjustment mold.

Further, it is preferable that the temperature adjustment part is configured to stretch the body portion by moving the temperature adjustment rod by the predetermined distance after maintaining a state where the temperature adjustment rod is in contact with the inner surface of the body portion for a predetermined time.

Another aspect of the present invention relates to a blow molding method including: an injection molding step of injection-molding a preform including a neck portion and a bottomed body portion continuous from the neck portion; a temperature adjustment step of performing a temperature adjustment treatment to the preform by bringing a temperature adjustment rod into contact with an inner surface of the preform while accommodating the preform in a temperature adjustment mold in a non-contact manner; and a blow molding step of blow-molding the preform, wherein in the temperature adjustment step, the body portion is stretched by moving the temperature adjustment rod toward a bottom surface portion side of the body portion by a predetermined distance, after the temperature adjustment rod inserted into the preform is brought into contact with an inner surface of the body portion other than a boundary portion between the body portion and the neck portion.

Advantageous Effects of Invention

According to present invention, the temperature condition of the preform can be optimized in a relatively short time by the temperature adjustment part, and a resin container having a good thickness distribution and appearance can be blow-molded by the blow molding part.

DESCRIPTION OF EMBODIMENTS

Hereinafter, an embodiment of the present invention will be described in detail with reference to the drawings.

First, an example of a shape of a resin container formed by a blow molding apparatus and a blow molding method according to the present embodiment will be described.

Figure 1:
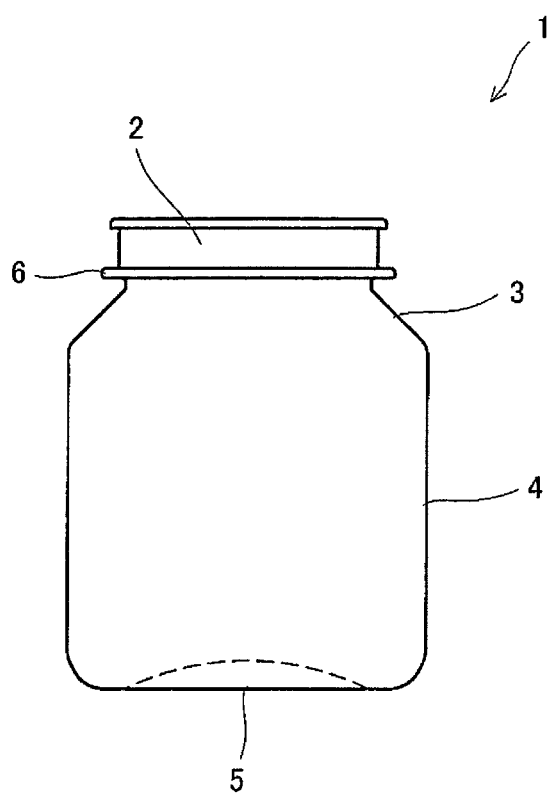
FIG. 1 is a diagram showing an example of a resin container formed by a blow molding apparatus according to the present invention.

As shown in FIG. 1, a resin container 1 is made of a synthetic resin such as polyethylene terephthalate (PET), polypropylene (PP), or polyethylene (PE), and is, for example, a small and lightweight container used for storing beverages and the like. The resin container (small and lightweight container) 1 includes a neck portion (mouth part) 2 provided on an upper end, a substantially cylindrical body portion 4 continuous from the neck portion 2 via a shoulder portion 3, and a bottom portion 5 closing a bottom of the body portion 4. A support ring 6 is provided on an outer peripheral surface of the neck portion 2 near a boundary between the neck portion 2 and the shoulder portion 3. In the above resin container 1, for example, dimensions of respective parts are set such that an outer diameter of the neck portion (mouth part) is 23 mm to 25 mm, a capacity thereof is 100 ml to 200 ml, and a weight thereof is 5 g to 20 g.

The shape of the resin container 1 is not particularly limited. In addition to the above small and lightweight container, a container having an outer diameter of the neck portion (mouth part) of, for example, 43 mm or more, and referred to as a wide-mouth container used for storing foods and the like may be used.

Such a resin container 1 is formed by blow-molding an injection-molded preform 10.

Figure 2:
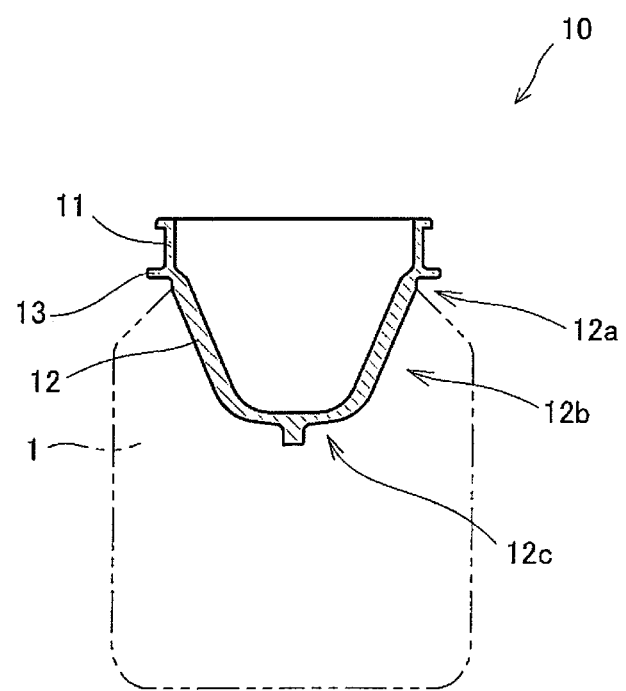
FIG. 2 is a diagram showing an example of a preform formed by a blow molding apparatus according to the present invention.

For example, as shown in FIG. 2, the preform 10 includes a neck portion 11 and a bottomed body portion 12 continuous from the neck portion 11. The body portion 12 includes an upper body portion (boundary part) 12a, a main body portion 12b, and a lower body portion 12c.

The upper body portion 12a is a portion forming at least a part (upper portion) of the shoulder portion 3 from immediately below the neck portion 2 of the resin container 1. The main body portion 12b is a portion forming at least the body portion 4 of the resin container 1, and may form a part (lower portion) of the shoulder portion 3 together with the body portion 4. The lower body portion 12c is a portion forming the bottom portion 5 of the resin container 1.

In addition, the upper body portion 12a is a portion connecting the neck portion 11 and the main body portion 12b, and has an inclination angle of an inner wall surface (in FIG. 2, an inclination angle with respect to an inner peripheral surface of the neck portion 11) larger than an inclination angle of an outer wall surface. A thickness of the upper body portion 12a gradually increases downward.

The main body portion 12b is a portion connected to the upper body portion 12a and the lower body portion 12c, and is formed such that an inner wall surface and an outer wall surface thereof are substantially parallel. A thickness of the entire main body portion 12b is larger than that of the upper body portion 12a.

The lower body portion 12c is a portion connected to the main body portion 12b, and has inclination angles (in FIG. 2, an inclination angle with respect to the inner peripheral surface of the neck portion 11) of an inner wall surface and an outer wall surface larger than those of other portions (the upper body portion 12a and the main body portion 12b). The lower body portion 12c is formed to be entirely thinner than the main body portion 12b, and has a gate mark of a hot runner (a part of an injection molding mold) at a lower end thereof.

The neck portion 11 is formed in substantially the same shape as the neck portion 2 of the resin container 1, and a support ring 13 is formed on an outer peripheral surface of the neck portion 11. Since the preform 10 has a large stretch ratio in a vertical axis and a horizontal axis when blow-molding the resin container 1, the body portion 12 is short and small and has a substantially tapered shape, and is formed in a so-called bowl shape. That is, the body portion 12 is formed such that a diameter of a boundary portion between the body portion 12 and the neck portion 11 (an upper end in the case of the upper body portion 12a) is the largest, and the diameter decreases toward the lower body portion (bottom surface portion) 12c side of the body portion 12.

Figure 3:
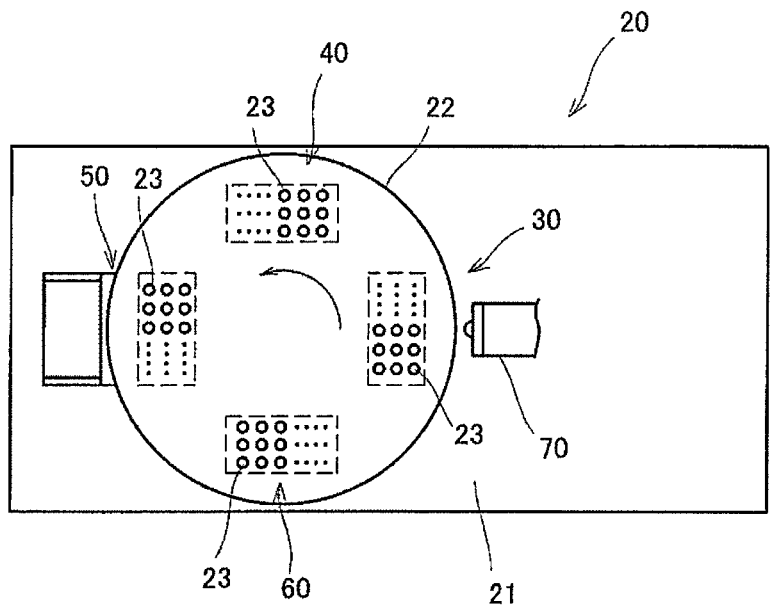
FIG. 3 is a diagram showing a schematic configuration of a blow molding apparatus according to an embodiment of the present invention.

Hereinafter, a blow molding apparatus for molding such a resin container 1 will be described. As shown in FIG. 3, a blow molding apparatus 20 is a so-called hot parison type (one-step type) apparatus, and includes, on a machine base 21, an injection molding part (injection molding device) 30, a temperature adjustment part (temperature adjustment device) 40, a blow molding part (blow molding device) 50, and an take-out part (take-out device) 60.

A nozzle of an injection part (injection device) 70 is connected to the injection molding part 30, and the injection molding part 30 forms the preform 10 having the above-described shape using a resin material injected from the injection part 70 (injection molding step). The temperature adjustment part 40 performs a temperature adjustment treatment to the injection-molded preform 10, and adjusts the temperature of the preform 10 to an appropriate temperature (temperature adjustment step). As will be described in more detail later, the temperature adjustment part 40 performs a stretch treatment (preliminary stretch treatment) to the preform 10 using, for example, a temperature adjustment rod, together with the temperature adjustment treatment.

The blow molding part 50 performs blow molding in which the preform 10 subjected to the temperature adjustment treatment and the preliminary stretch treatment performed by the temperature adjustment part 40 is, for example, stretched in a vertical axis direction by a stretch rod and is stretched in a horizontal axis direction by high-pressure air, to form the resin container 1 as a final molded product (blow molding step). The resin container 1 thus formed is taken out to the outside by the take-out part 60 (take-out step).

A rotation plate (transfer plate) 22 is provided above the injection molding part 30, the temperature adjustment part 40, the blow molding part 50, and the take-out part 60. The rotation plate 22 is intermittently rotatable with respect to the machine base 21, for example, in a counterclockwise direction. At each of four locations in a circumferential direction of the rotation plate 22, a lip mold including a pair of split molds 23 is provided. The preform 10 and the resin container 1 are held by the lip mold 23 and are sequentially transported to a predetermined device by the intermittent rotation of the rotation plate 22. The lip mold 23 is provided in at least one row and preferably three or more rows, in a radial direction of the rotation plate 22.

The present invention is characterized by the preliminary stretch treatment performed by the temperature adjustment part 40 of the blow molding apparatus 20 having such a configuration. More specifically, the present invention is characterized by the preliminary stretch treatment performed by the temperature adjustment part 40 of the blow molding apparatus 20 operated in a high cycle (for example, 7 seconds or shorter). Hereinafter, the preliminary stretch treatment performed by the temperature adjustment part 40 will be described in detail with reference to FIG. 4 to FIG. 6.

Figure 4:
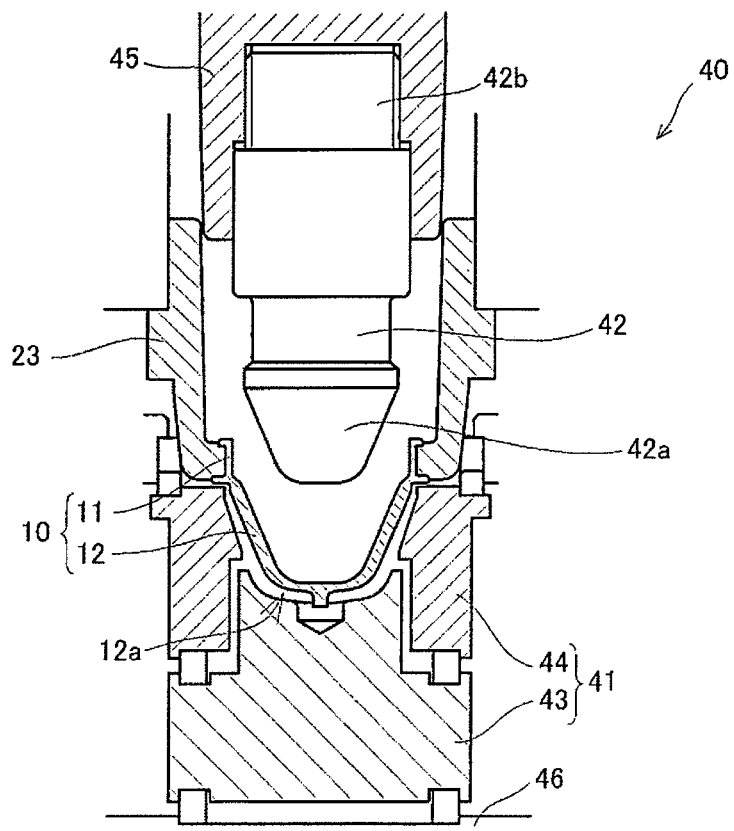
FIG. 4 is a cross-sectional view of a temperature adjustment mold provided in a temperature adjustment part according to the embodiment of the present invention.
Figure 5:
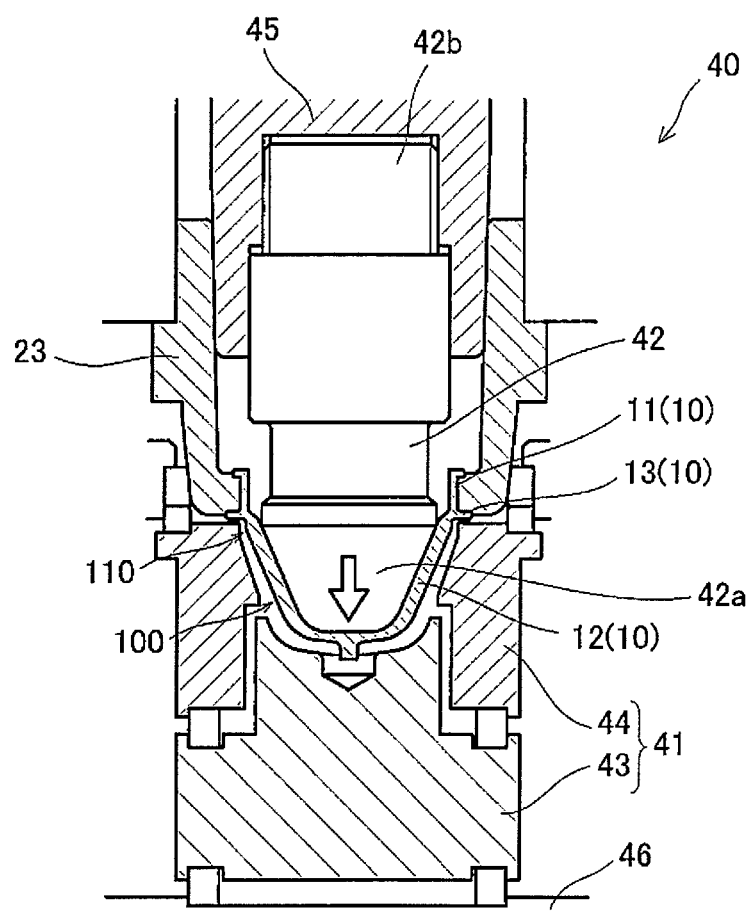
FIG. 5 is a cross-sectional view of the temperature adjustment mold provided in the temperature adjustment part according to the embodiment of the present invention.
Figure 6:
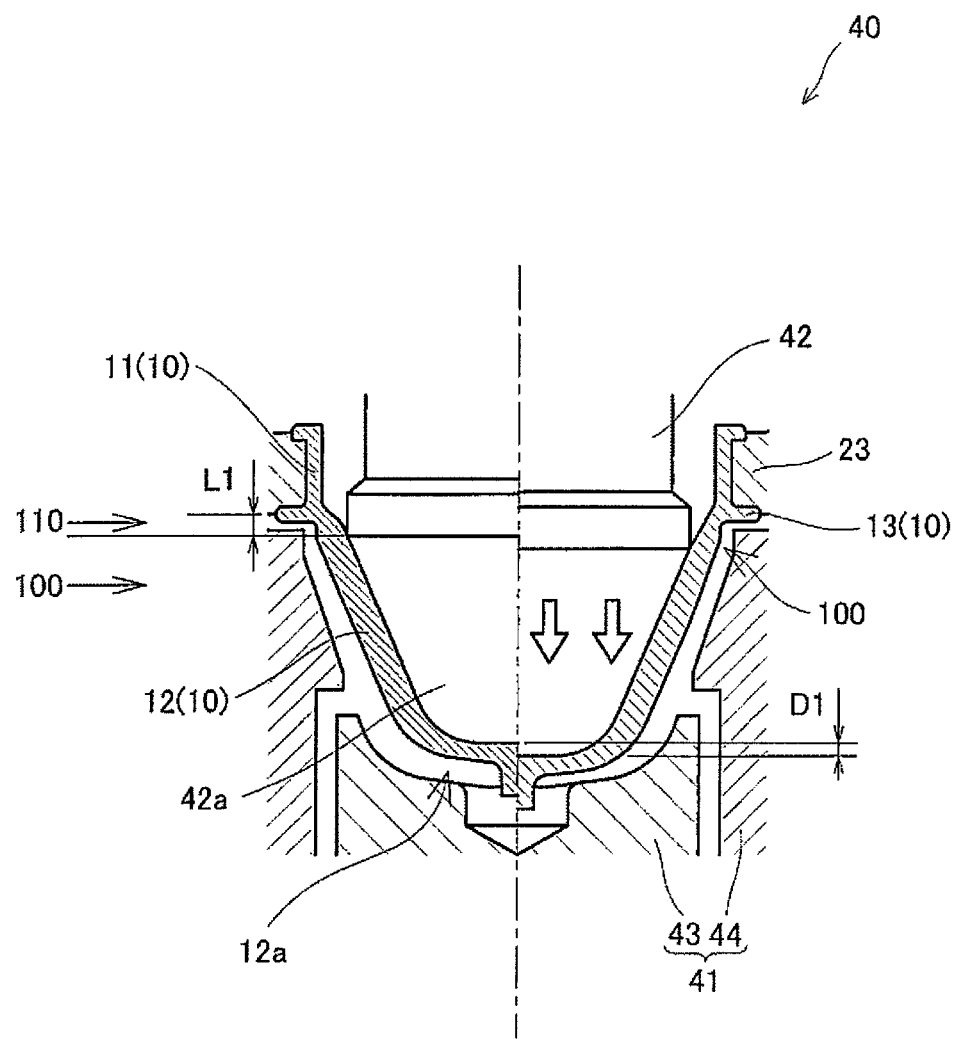
FIG. 6 is an enlarged cross-sectional view of the temperature adjustment mold provided in the temperature adjustment part according to the embodiment of the present invention.

FIG. 4 and FIG. 5 are diagrams showing a schematic configuration of a temperature adjustment mold provided in the temperature adjustment part. FIG. 4 shows a state where the preform is accommodated in a heating pot, and FIG. 5 shows a state where the temperature adjustment rod is lowered to come into contact with the inner surface of the preform. FIG. 6 is an enlarged view of the temperature adjustment mold provided in the temperature adjustment part, in which a left side shows a state where the temperature adjustment rod is lowered to come into contact with the inner surface of the preform, and a right side shows a state where the temperature adjustment rod is further lowered to stretch the preform.

As shown in FIG. 4, the temperature adjustment part 40 includes a heating pot 41 serving as the temperature adjustment mold in which the preform 10 is accommodated, and a temperature adjustment rod 42. The heating pot 41 includes a first heating block 43 disposed to face the lower body portion (bottom surface part) 12c of the body portion 12 of the preform 10, and a second heating block 44 disposed to surround the body portion 12. A plurality of second heating blocks 44 may be provided.

Although not shown, the temperature adjustment part 40 includes heating pots 41 and temperature adjustment rods 42 disposed in a plurality of rows (three rows in the present embodiment), and is configured to be capable of performing a temperature adjustment treatment to a large number (36: 12×3 rows in the present embodiment) of preforms 10 at the same time.

Both the first heating block 43 and the second heating block 44 included in the heating pot 41 are configured such that the temperature can be adjusted within a range of, for example, 100° C. to 400° C. The heating pot 41 is provided in the same number as the lip molds 23, and lower ends thereof are connected to a heating pot fixing member 46 which can move up and down.

The heating pot 41 is configured to be capable of accommodating the preform 10 in a state where the preform 10 is not in contact with the first heating block 43 and the second heating block 44. That is, in a case where the preform 10 is accommodated in the heating pot 41, a space (gap) of about several millimeters is ensured between the preform 10 and the first heating block 43 and the second heating block 44.

The temperature adjustment rod 42 is a rod-shaped member to be inserted into the preform 10, and has a contact part 42a having a surface along the inner surface of the preform 10 and in contact with the inner surface of the body portion 12 of the preform 10 on a distal end side.

The temperature adjustment rod 42 is provided in the same number as the lip molds 23, and is connected to a temperature adjustment rod fixing member 45, which can move up and down, by an engagement part 42b on a side opposite to the contact part 42a. In the present embodiment, the engagement part 42b is screwed to the temperature adjustment rod fixing member 45. That is, for example, a male screw is formed on an outer peripheral surface of the engagement part 42b, and, for example, a female screw is formed on an inner peripheral surface of the temperature adjustment rod fixing member 45.

In this configuration, by adjusting a tightening amount of the engagement part 42b, a lower limit position (elevation stroke) of the temperature adjustment rod 42 at the time of lowering can be adjusted. Accordingly, a stretch amount of a non-contact region 110 described later (an amount of decrease in the temperature of the upper body portion 12a) can be appropriately adjusted.

The contact part 42a is configured to be capable of adjusting the temperature within a predetermined range. In the present embodiment, the contact part 42a is configured to be capable of being set to a temperature (for example, 60° C. to 80° C., more preferably 70° C.±5° C.) lower than the temperature (for example, 100° C. to 120° C.) of the preform 10 when accommodated in the heating pot 41.

In the temperature adjustment part 40 having such a configuration, when the preform 10 is transported from the injection molding part 30, the preform 10 is first accommodated in the heating pot 41 adjusted to a predetermined temperature (see FIG. 4). As described above, in this state, a space (gap) is ensured between the preform 10 and the first heating block 43 and the second heating block 44.

When the preform 10 is accommodated in the heating pot 41, the temperature adjustment rod 42 is lowered (moved) and inserted into the preform 10, and the contact part 42a comes into contact with the inner surface of the body portion 12 of the preform 10 to perform a temperature adjustment treatment to the preform 10 (see FIG. 5).

In the present embodiment, the preform 10 is slightly cooled by bringing the temperature adjustment rod 42 (contact part 42a) into contact with the inner surface of the preform 10. At the same time, the heating pot 41 is set to, for example, about 250° C., and an outer surface of the preform 10 is heated in a non-contact manner to maintain a temperature (residual heat) required for the stretch treatment by the blow molding part 50. A contact type (heat conduction type) temperature adjustment is more efficient in heat exchange than the non-contact type (radiation type) temperature adjustment such as a heating rod, and is effective in making the temperature of a plurality of preforms 10 uniform in a short time.

Accordingly, the uneven temperature of the preforms 10 is eliminated and the temperatures of the plurality of preforms 10 are equalized (a temperature difference is reduced), thereby making it possible to adjust all the preforms 10 equally to the temperature suitable for blow molding.

Here, the contact part 42a of the temperature adjustment rod 42 is provided to come into contact with the inner surface of the body portion 12 of the preform 10 other than the boundary portion between the body portion 12 and the neck portion 11. That is, in a state where the contact part 42a is in contact with a contact region 100 of the body portion 12 of the preform 10, the body portion 12 of the preform 10 has the non-contact region 110, with which the contact part 42a is not in contact, at the boundary portion between the body portion 12 and the neck portion 11.

For example, in the present embodiment, the diameter of the contact part 42a of the temperature adjustment rod 42 is slightly smaller than an inner diameter of the neck portion 11 of the preform 10. In addition, a length of the contact part 42a in the vertical axis direction is shorter than a length of the inner surface of the body portion 12 of the preform 10 in the vertical axis direction.

Therefore, in a state where the temperature adjustment rod 42 is in contact with the body portion 12 of the preform 10, a region with which the temperature adjustment rod 42 is not in contact is present at the boundary portion between the body portion 12 and the neck portion 11. That is, in a state where the temperature adjustment rod 42 (contact part 42a) is in contact with the contact region 100 of the body portion 12 of the preform 10, the non-contact region 110 with which the temperature adjustment rod 42 is not in contact is present surrounding the contact region 100.

In other words, the contact part 42a of the temperature adjustment rod 42 is formed in a predetermined shape (diameter and height) such that the non-contact region 110 is present at the boundary portion between the body portion 12 and the neck portion 11 (surrounding the contact region 100). The non-contact region 110 includes at least the upper body portion 12a of the preform 10, and the contact region 100 includes the main body portion 12b and the lower body portion 12c of the preform 10.

A length L1 (a length from a lowermost position of the lip mold 23 to an uppermost position of the contact part 42a) of the non-contact region 110 in the vertical axis direction of the preform 10 may be appropriately determined in consideration of the shapes of the resin container 1, the preform 10, and the like, and is preferably set, for example, within 5 mm (see FIG. 6).

When the contact part 42a of the temperature adjustment rod 42 comes into contact with the inner surface (contact region 100) of the body portion 12 of the preform 10 in this manner, the temperature adjustment part 40 performs a preliminary stretch treatment of further lowering (moving) the temperature adjustment rod 42 by a predetermined distance D1 to stretch the preform 10 (see FIG. 6).

At this time, the temperature of the contact part 42a of the temperature adjustment rod 42 is set to be lower than the temperature of the preform 10. Therefore, when the temperature adjustment rod 42 (contact part 42a) comes into contact with the contact region 100 of the preform 10, the contact region 100 of the preform 10 is substantially cooled (temperature adjustment treatment). However, a temperature of the non-contact region 110 with which the temperature adjustment rod 42 is not in contact decreases more slowly than that of the contact region 100 with which the temperature adjustment rod 42 is in contact. Therefore, the temperature (residual heat) of the non-contact region 110 of the preform 10 is relatively higher (larger) than the temperature (residual heat) of the contact region 100 of the preform 10.

Therefore, when the temperature adjustment rod 42 is lowered in the preliminary stretch treatment, the non-contact region 110 of the preform 10, that is, the boundary portion (a side of the support ring 13 opposite to the neck portion 11) between the body portion 12 and the neck portion 11 is stretched locally. The contact region 100 of the preform 10 is not substantially stretched, and the non-contact region 110 is stretched locally. With this stretching, the thickness of the non-contact region 110 of the preform 10 is slightly reduced to a predetermined thickness.

At the same time, with this stretching, the temperature of the non-contact region 110 (the upper body portion 12a) decreases, and the temperature of the contact region 100 (the main body portion 12b and the lower body portion 12c) of the body portion 12 becomes relatively higher than that of the non-contact region 110. That is, the residual heat of the part of the body portion 12 other than the non-contact region 110 becomes relatively larger than that of the non-contact region 110.

As described above, in the blow molding apparatus 20 according to present invention, the temperature adjustment part 40 performs temperature adjustment to the preform 10 (temperature adjustment treatment), and also performs local stretching to the preform 10 (preliminary stretch treatment). Therefore, the temperature condition of the preform 10 can be appropriately adjusted in a relatively short time.

Accordingly, the resin container 1 having a good thickness distribution and appearance can be blow-molded. In detail, with the blow molding part 50, a portion having a relatively high temperature (having relatively large residual heat) in the body portion 12 of the preform 10 is preferentially stretched rather than a portion (boundary portion) directly below the thin neck portion 11 having a relatively low temperature (having relatively small residual heat). As a result, the resin container 1 having a good thickness distribution and appearance can be blow-molded, in which the large thickness of the shoulder portion 3 and the small thickness of the body portion 4 and the bottom portion 5 are eliminated.

In the preliminary stretch treatment, the distance D1 for lowering the temperature adjustment rod 42 may be appropriately determined in consideration of the shape of the preform 10 and the like. It is preferable to lower the preform 10 by such a distance that the preform 10 does not come into contact with the first heating block 43 constituting the heating pot 41. If the preform 10 is lowered by such a distance, the temperature condition of the preform 10 can be sufficiently optimized.

In the blow molding apparatus in the related art, the temperature adjustment treatment is performed to the preform before the preform is blow-molded. However, as described above, the preform cannot be subjected to an appropriate temperature adjustment treatment under high cycle conditions, and the thickness of the resin container cannot not be made sufficiently uniform.

In contrast, in the blow molding apparatus 20 according to present invention, the temperature adjustment part 40 performs the preliminary stretch treatment and the temperature adjustment treatment to the preform 10, so that the thickness of the resin container 1 formed by blow molding can be made sufficiently uniform in a relatively short time. That is, even when the time for performing the temperature adjustment treatment is short, a sharp temperature distribution can be imparted to one preform 10 (clear and appropriate temperature difference can be imparted by distinguishing a part to be stretched from a part not to be stretched), and also, a plurality of preforms 10 can be kept at a uniform temperature.

Accordingly, by increasing the thickness of a portion of the resin container 1 where the strength is to be ensured and by reducing the thickness of a portion where the strength is not required, a plurality of containers having substantially uniform quality can be manufactured at the same time. Therefore, even under high cycle conditions, the temperature condition of the preform 10 can be optimized, and the resin container 1 having a good thickness distribution and appearance can be formed.

For example, in the present embodiment, when the temperature adjustment rod 42 is brought into contact with the inner surface of the body portion 12 of the preform 10, the preform 10 is stretched by lowering the temperature adjustment rod 42 by a predetermined distance without stopping. Therefore, the time required for the temperature adjustment treatment and the preliminary stretch treatment in the temperature adjustment part 40 can be kept as short as possible.

However, the temperature adjustment rod 42 does not necessarily have to be continuously lowered (moved). For example, the lowering of the temperature adjustment rod 42 may be temporarily stopped in a state of being in contact with the inner surface of the body portion 12 of the preform 10, and after maintaining this state for a predetermined time, the temperature adjustment rod 42 may be lowered again to stretch the preform 10 (the body portion 12).

Depending on the shape and the like of the resin container 1, the temperature adjustment treatment to the preform 10 can be performed more appropriately.

Further, in the present embodiment, the resin container 1 is a small and lightweight container, the body portion 12 of the preform 10 is formed in a bowl shape, and the length (height) thereof is very short. Therefore, it is difficult to optimize the temperature condition of the preform 10. However, it is easy to optimize the temperature condition of the preform 10 by performing the temperature adjustment treatment and the preliminary stretch treatment by the temperature adjustment part 40.

Although one embodiment of the present invention is described above, the present invention is not limited to the above embodiment. The present invention can be appropriately modified without departing from the scope of the invention.

REFERENCE SIGNS LIST

20 Blow molding apparatus
21 Machine base
22 Rotation plate
23 Lip mold
30 Injection molding part (injection molding device)
40 Temperature adjustment part (temperature adjustment device)
41 Heating pot
42 Temperature adjustment rod
42a Contact part
42b Engagement part 43 First heating block
44 Second heating block
45 Temperature adjustment rod fixing member
46 Heating pot fixing member
50 Blow molding part (blow molding device)
60 Take-out part (take-out device)
70 Injection part (injection device)
100 Contact region
110 Non-contact region

The invention claimed is:

1. A blow molding apparatus comprising:
an injection molding part configured to injection-mold a preform including a neck portion and a bottomed body portion continuous from the neck portion;
a temperature adjustment part including a temperature adjustment mold accommodating the preform and a temperature adjustment rod to be inserted into the preform, the temperature adjustment part configured to perform a temperature adjustment treatment to the preform by bringing the temperature adjustment rod into contact with an inner surface of the preform while accommodating the preform in the temperature adjustment mold in a non-contact manner; and
a blow molding part configured to blow-mold the preform to form a resin container,
wherein the temperature adjustment part is configured to stretch the body portion by moving the temperature adjustment rod toward a bottom surface portion side of the body portion by a predetermined distance, after inserting the temperature adjustment rod into the preform to bring the temperature adjustment rod into contact with an inner surface of the body portion other than a boundary portion between the body portion and the neck portion.

2. The blow molding apparatus according to claim 1, wherein the temperature adjustment part is configured to stretch the body portion by moving the temperature adjustment rod within a range where the preform does not come into contact with the temperature adjustment mold.

3. The blow molding apparatus according to claim 1, wherein the temperature adjustment rod is adjusted to a temperature lower than that of the preform when the preform is accommodated in the temperature adjustment mold.

4. The blow molding apparatus according to claim 1, wherein the temperature adjustment part is configured to stretch the body portion by moving the temperature adjustment rod by the predetermined distance after maintaining a state where the temperature adjustment rod is in contact with the inner surface of the body portion for a predetermined time.

5. A blow molding method comprising:
injection-molding a preform including a neck portion and a bottomed body portion continuous from the neck portion;
performing a temperature adjustment treatment to the preform by bringing a temperature adjustment rod into contact with an inner surface of the preform while accommodating the preform in a temperature adjustment mold in a non-contact manner; and
blow-molding the preform,
wherein during the temperature adjustment, the body portion is stretched by moving the temperature adjustment rod toward a bottom surface portion side of the body portion by a predetermined distance, after the temperature adjustment rod inserted into the preform is brought into contact with an inner surface of the body portion other than a boundary portion between the body portion and the neck portion.

* * * * *